(12) United States Patent
Lu et al.

(10) Patent No.: US 12,511,714 B2
(45) Date of Patent: Dec. 30, 2025

(54) IMAGE ANOMALY DETECTION METHOD BASED ON ZERO-SHOT LEARNING

(71) Applicant: Beihang University, Beijing (CN)

(72) Inventors: Feng Lu, Beijing (CN); Yunfei Liu, Beijing (CN)

(73) Assignee: Beihang University, Beijing (CN)

( * ) Notice: Subject to any disclaimer, the term of this patent is extended or adjusted under 35 U.S.C. 154(b) by 298 days.

(21) Appl. No.: 17/561,869

(22) Filed: Dec. 24, 2021

(65) Prior Publication Data
US 2022/0222794 A1 Jul. 14, 2022

(30) Foreign Application Priority Data
Jan. 8, 2021 (CN) .......................... 202110026414.1

(51) Int. Cl.
| | |
|---|---|
| G06T 5/50 | (2006.01) |
| G06N 3/042 | (2023.01) |
| G06T 3/4046 | (2024.01) |
| G06T 7/00 | (2017.01) |
| G06T 7/11 | (2017.01) |
| G06T 7/77 | (2017.01) |

(52) U.S. Cl.
CPC .............. *G06T 5/50* (2013.01); *G06N 3/042* (2023.01); *G06T 3/4046* (2013.01); *G06T 7/0002* (2013.01); *G06T 7/0004* (2013.01); *G06T 7/11* (2017.01); *G06T 7/77* (2017.01); *G06T 2207/20084* (2013.01); *G06T 2211/441* (2023.08)

(58) Field of Classification Search
CPC ....... G06T 5/50; G06T 3/4046; G06T 7/0002; G06T 7/0004; G06T 7/11; G06T 2207/20084; G06T 2211/441; G06T 2207/20076; G06T 2207/20081; G06T 7/77; G06T 9/002; G06N 3/042; G06N 3/045; G06N 3/08; G06V 10/25
See application file for complete search history.

(56) References Cited

U.S. PATENT DOCUMENTS

| | | | |
|---|---|---|---|
| 11,222,217 B1 * | 1/2022 | Zhang | G06F 18/214 |
| 2017/0206464 A1 * | 7/2017 | Clayton | G06N 3/044 |
| 2019/0228268 A1 * | 7/2019 | Zhang | G06V 10/82 |
| 2020/0134804 A1 * | 4/2020 | Song | G06V 10/764 |

(Continued)

OTHER PUBLICATIONS

Amanda Berg et al. "Unsupervised Learning of Anomaly Detection from Contaminated Image Data using Simultaneous Encoder Training", Nov. 20, 2019.

(Continued)

*Primary Examiner* — Michael P LaPage

(57) ABSTRACT

The embodiments of this disclosure disclose an image anomaly detection method. A specific implementation of the method comprises: obtaining a test image; inputting the test image to an autoencoder to obtain a first reconstructed image; inputting the first reconstructed image to an expert network to obtain a second reconstructed image; based on the test image, the first reconstructed image, the second reconstructed image and a perceptual measurement method, generating an anomaly score matrix; based on the anomaly score matrix, generating anomalous area information. This implementation achieves a zero-shot training network and improves the accuracy of locating anomalous areas.

4 Claims, 3 Drawing Sheets

(56) References Cited

U.S. PATENT DOCUMENTS

2021/0287037 A1* 9/2021 Chen ..................... G06V 10/82
2022/0358749 A1* 11/2022 Yonetani ................. G06N 3/08
2023/0154055 A1* 5/2023 Besenbruch ......... G06V 10/774
375/240.03

OTHER PUBLICATIONS

Christoph Baur "Deep Autoencoding Models for Unsupervised Anomaly Segmentation in Brain MR Images", Apr. 12, 2018.
Jerone T. A. Andrews et al. "Transfer Representation-Learning for Anomaly Detection" Jul. 1, 2016.

* cited by examiner

IMAGE ANOMALY DETECTION METHOD BASED ON ZERO-SHOT LEARNING

CROSS-REFERENCE TO RELATED APPLICATIONS

The present application is based on, and claims priority from, Chinese application number CN202110026414.1, filed Jan. 8, 2021, closure of which is hereby incorporated by reference herein in its entirety.

TECHNICAL FIELD

This disclosure relates to the field of computer vision and image processing, and in particular, to an image anomaly detection method.

BACKGROUND

An anomaly detection task is to detect rare categories, events, or areas that are significantly different from a large number of images. There are a variety of computer vision applications for the detection of anomalous objects or areas, such as detecting industrial product defects, segmenting diseased areas in retinal images, detecting anomalous behaviors in surveillance video content, and determining the location of survivors in rescue operations, and so on. In recent years, with the extensive application of deep learning and computer vision in the industry, the value of image anomaly detection has gradually become prominent. On the other hand, anomaly detection is still a very challenging problem in the field of computer vision. Most of the current solutions are based on deep learning, so a large number of sample-balanced positive and negative samples are needed to train the model.

In order to reduce the demand for the quantity of anomalous images, Andrews et al. (Andrews, J. T. A., Tanay, T., Morton, E. J., & Griffin, L. D.: "Transfer Representation-Learning for Anomaly Detection" (2016)) determines whether an image is anomalous by assuming that the anomaly occurs in the category of the entire image and judging whether the data feature is outlier. In recent years, Baur et al. (Baur, C., Wiestler, B., Albarqouni, S., & Navab, N.: "Deep Autoencoding Models for Unsupervised Anomaly Segmentation in Brain MR Images" (April 2018)) used an autoencoder to perform reconstruction on a large amount of normal data. The autoencoder is a neural network with the same input and learning goal. Based on the assumption that the autoencoder cannot reconstruct an unseen anomalous area, whereby the difference between the input image and the reconstructed image is calculated in the test stage, and the places with large differences are divided into anomalous areas. Berg et al. (Berg, A., Ahlberg, J., & Felsberg, M.: "Unsupervised Learning of Anomaly Detection from Contaminated Image Data using Simultaneous Encoder Training" (November 2019)) also added a layer-jump connection structure to the autoencoder to enhance the quality of the reconstructed image. Reconstruction refers to the operation of constructing or restoring an image from a non-image form. An anomalous image refers to an image with an anomalous area.

However, when using the above approaches to detect anomalies in an image, the following technical problems often occur:

First, the method based on deep learning needs a large number of sample-balanced positive and negative samples to train the model. However, due to the rare occurrence and rich variety of anomalies, the number of anomalous images is very scarce.

Second, the method based on an autoencoder may either mistakenly divide the part of non-anomalous area into the part of anomalous area due to the extra image difference resulted from reconstruction of low-resolution, or have the anomalous area reconstructed together thanks to reconstruction of high-resolution, causing the difference between the reconstructed image and the input image to lose the pixel information of the anomalous area.

SUMMARY OF THE DISCLOSURE

The content of this disclosure is to introduce concepts in a brief form, and these concepts will be described in detail in the following section of the detailed description. The content of this disclosure is not intended to identify the key features or essential features of the claimed technical solution, nor is it intended to limit the scope of the claimed technical solution.

Some embodiments of this disclosure propose an image anomaly detection method to solve one or more of the technical problems mentioned in the background above.

Some embodiments of this disclosure provide an image anomaly detection method, the method includes: proposing a two-stage anomaly detection method to learn zero-anomaly samples, thereby effectively locating an anomalous area in an image; inventing an autoencoder structure that is based on mutual information, and by inputting images, effectively reconstructing a corresponding anomaly-free image of low-resolution; further designing an expert network, and on the basis of the anomaly-free image outputted in the first stage, accurately reconstructing a corresponding anomaly-free image of high-resolution; based on the output results of the first and second stages, and in combination with the input images, inventing a novel type of anomaly measurement method, for accurately and efficiently calculating the anomalous value of each position in the image, and further based on this anomalous value, dividing the normal area and the anomalous area in the image.

The above-mentioned various embodiments of this disclosure have the following beneficial effects of: inventing a two-stage anomaly detection framework, i.e., by first generating an image with low definition and no anomalous area based on the input image and then further reconstructing an image with high definition and no anomalous area, solving the problem present in the previous autoencoder, and being conducive to the stable calculation of the anomalous area; as for the autoencoder may reconstruct a part of anomalous area when reconstructing an input image, inventing a novel type of self-encoding structure, i.e., by maximizing the mutual information between the input image and the feature from reconstruction and at the same time performing initial reconstruction of the feature that satisfies the mutual information, obtaining an image with low definition and no anomalous area, thereby effectively reducing the possibility of an anomalous area being reconstructed; inventing an expert network to process an image with low definition and no anomalous area to obtain an image with high definition and no anomalous area; in the case of having obtained the image with low definition and no anomalous area and the image with high definition and no anomalous area, this present invention proposes a perceptual measurement method, which can improve the accuracy of locating anomalous areas.

BRIEF DESCRIPTION OF THE DRAWINGS

The above and other features, advantages, and aspects of the embodiments of this disclosure will become more apparent in conjunction with the accompanying drawings and with reference to the following detailed description. Throughout the drawings, the same or similar reference signs indicate the same or similar elements. It should be understood that the drawings are schematic, and the components and elements are not necessarily drawn to scale.

DETAILED DESCRIPTION OF THE INVENTION

Figure 1:
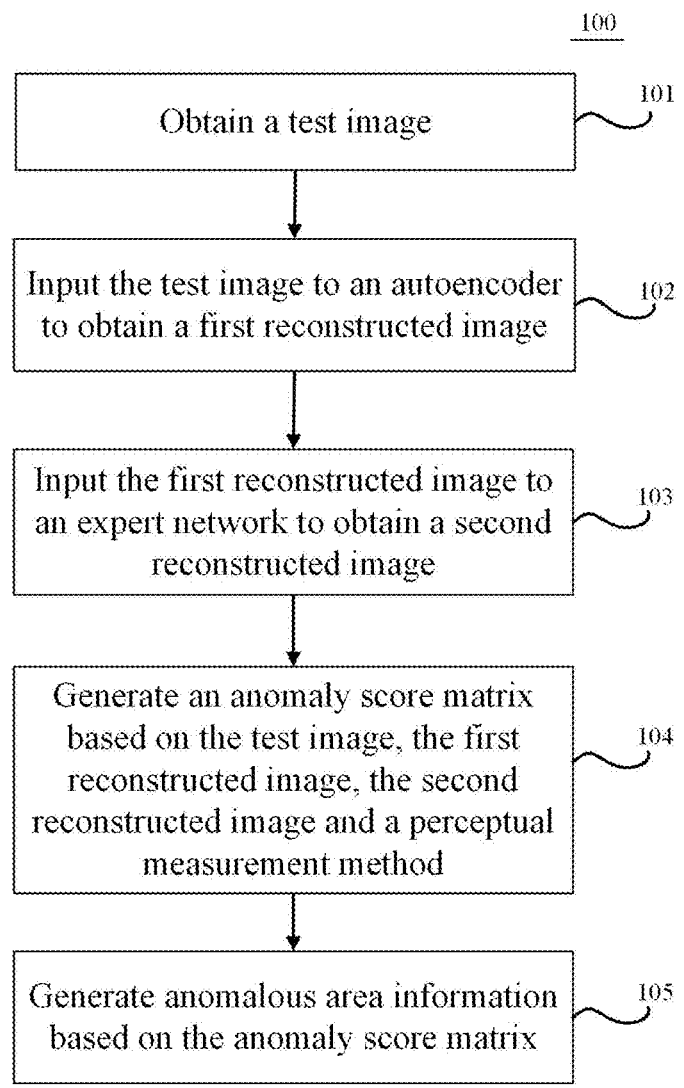
FIG. 1 is a flowchart of some embodiments of an image anomaly detection method according to this disclosure.

Hereinafter, the embodiments of this disclosure will be described in more detail with reference to the accompanying drawings. Although certain embodiments of this disclosure are shown in the drawings, it should be understood that this disclosure can be implemented in various forms, and shall not be construed as being limited to the embodiments set forth herein. On the contrary, these embodiments are provided for a more thorough and complete understanding of this disclosure. It should be understood that the drawings and embodiments of this disclosure are used only for illustrative purposes, not to limit the protection scope of this disclosure.

Besides, it should be noted that, for ease of description, only the portions related to the relevant invention are shown in the drawings. In the case of no conflict, the embodiments in this disclosure and the features in the embodiments can be combined with each other.

It should be noted that such adjuncts as "one" and "more" mentioned in this disclosure are illustrative, not restrictive, and those skilled in the art should understand that unless the context clearly indicates otherwise, they should be understood as "one or more".

The following is a detailed description of this disclosure with reference to the drawings and in conjunction with embodiments.

FIG. 1 is a flowchart of some embodiments of an image anomaly detection method according to this disclosure. The image anomaly detection method includes the following steps to:

Step 101: Obtain a test image.

In some embodiments, the executive body of the image anomaly detection method can obtain a test image by way of wired connection or wireless connection. Wherein, the test image is an image that includes an object to be detected.

Figure 3:
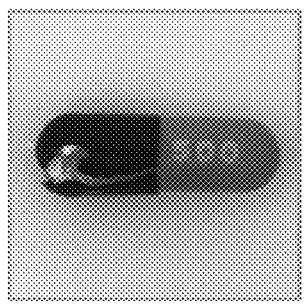
FIG. 3 is a schematic diagram of one application scenario of the image anomaly detection method according to some embodiments of this disclosure.

For example, the object to be detected is a capsule, and the test image can be a damaged or a complete capsule. As shown in FIG. 3, the image with an anomalous area is an image of a damaged capsule, and the damaged area displayed on the image is the anomalous area. The image without any anomalous area is an image of a complete capsule.

Step 102: Input the test image to an autoencoder to obtain a first reconstructed image.

In some embodiments, the executive body described above may use an autoencoder to process the test image in various ways to obtain a first reconstructed image. An anomalous area refers to the target area of interest in the detection process. Among them, the anomalous area has scale invariance, that is, the anomalous area is still an anomalous area as the test image is zoomed in or out.

Figure 4:
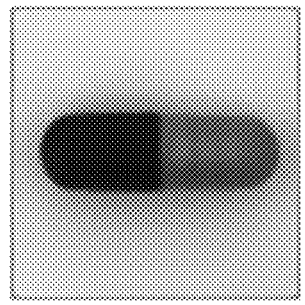
FIG. 4 is a schematic diagram of another application scenario of the image anomaly detection method according to some embodiments of this disclosure.

For example, from the first reconstructed image as obtained in FIG. 4 it can be seen that, as compared with FIG. 3, the manifestation of the first reconstructed image is an image with fairly low definition and no anomalous area.

The above-mentioned autoencoder can be obtained through the following process:

The autoencoder mainly includes three parts: encoder, discriminator and decoder. In the training process, the training sample is an image that includes an object to be detected but has no anomalous area. For example, the object to be detected is a capsule, the anomalous area is the damaged area on the capsule, and the training sample can be a complete capsule image with the same shape.

The encoder directly receives the sample set x, outputs the intermediate feature set z, and then the intermediate feature set is input to the decoder to obtain a reconstructed image set m. The set x here means that each input to the network is a batch of samples.

To be specific, the encoder can be composed of several convolution modules connected, wherein the convolution module may be an inception module, or a convolution layer followed by an activation layer, or a residual module. The inception structure is a deep learning structure, and the entire inception structure is connected in series by multiple inception modules. The main contributions of the inception structure include that: one is that 1×1 convolution can be used to increase and reduce dimensionality; and the other is that convolution and re-aggregation can be performed on multiple sizes at the same time. The last layer of each convolution module is a 2×2 pooling layer. The generation manner of the intermediate feature set z is: $z=E_M(x)$, wherein, $E_M$ represents the encoder, $E_M(x)$ represents the output obtained by inputting the sample set x to the encoder.

Relative entropy is used to measure the difference between two positive functions or probability distributions. In the training process, the intermediate feature set z needs to be constrained to satisfy the normal distribution. Assuming that the sample q obeys the standard normal distribution, the relative entropy can be used to constrain the intermediate feature set z, with the formula as follows:

$$KL(z, q) = -0.5 \times \frac{1}{B \times C} \sum_{b=1}^{B} \sum_{c=1}^{C} \left(1 + \log(\sigma_{b,c}) - \mu_{b,c}^2 - \sigma_{b,c}\right).$$

Wherein, $KL(z,q)$ represents the relative entropy of the intermediate feature set z and the sample q. B represents the number of samples in one batch. C represents the number of feature maps of the intermediate features corresponding to one sample. b represents the serial number of the samples in one batch. c represents the serial number of the feature maps in the intermediate features corresponding to one sample. $\mu_{b,c}$ represents the mean value of all the elements in the feature map with the serial number c in the intermediate feature corresponding to the sample with the serial number b. $\sigma_{b,c}$ represents the variance of all elements in the feature map with the serial number c in the intermediate feature corresponding to the sample with the serial number b.

Figure 2:
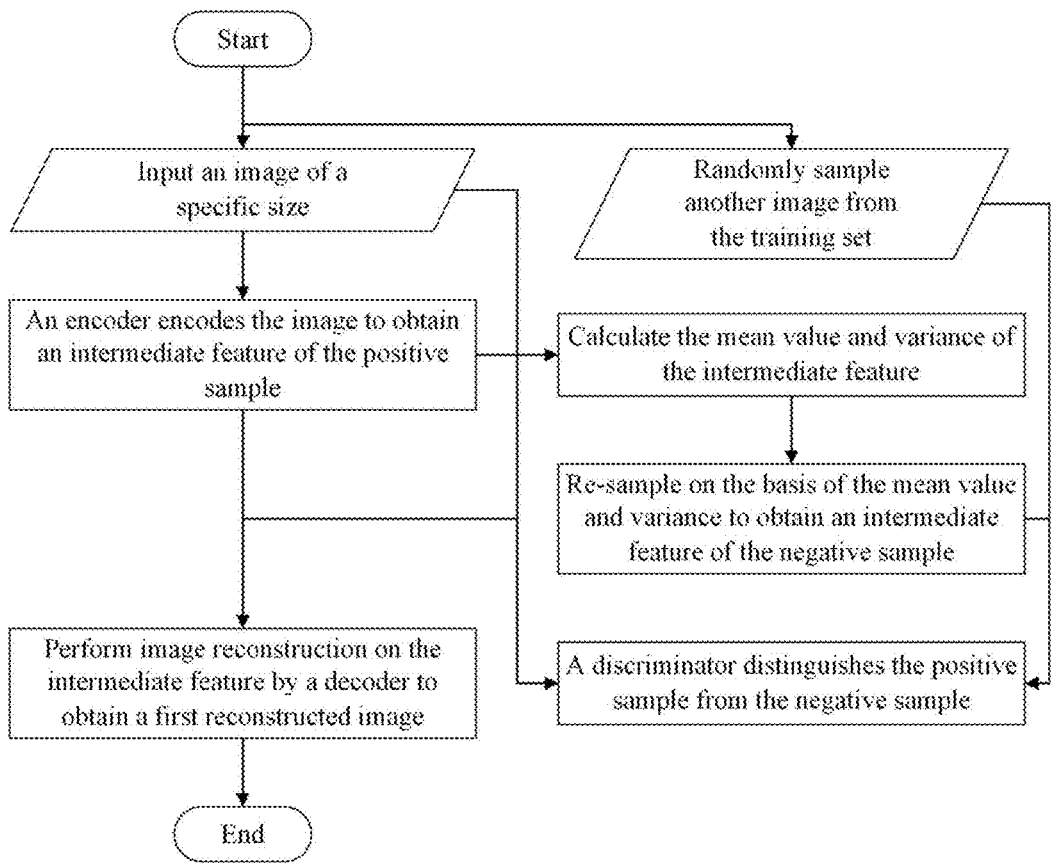
FIG. 2 is a flowchart of some embodiments of training an autoencoder according to this disclosure.

Mutual information is a measure of the degree of interdependence between two random variables. As in FIG. 2, it gives a flowchart of training the autoencoder. By maximizing the mutual information between the sample set x and the intermediate feature set z, the amount of information of the sample set x learned by the intermediate feature set z can be maximized. A discriminator is introduced to distinguish between positive samples and negative samples. The sample set x is paired with the intermediate feature set z generated therein, and the obtained sample (x,z) is defined as a positive sample. A batch of sample sets are randomly sampled from the total sample set where the sample set x has been removed, and are denoted as x̃. Using the above mean value and variance corresponding to each feature map in the intermediate feature set z at ($\mu_{b,c}, \sigma_{b,c}$) as the parameter of normal distribution, random sampling is performed to generate a matrix of the size of the feature map. Wherein, all elements in the matrix obey the normal distribution whose parameter is ($\rho_{b,c}, \sigma_{b,c}$). In the end, the feature set z̃ is obtained. In order to reduce the amount of calculation, the x̃ can be generated by randomly scrambling the samples in the sample set x. The sample (x̃,z̃) is defined as a negative sample.

The discriminator T can be composed of a two-dimensional convolutional neural network followed by a plurality of fully connected layers, wherein the number of fully connected layers is not limited, and the number of neurons in the last fully connected layer is 1. For example, take the (x,z) as the input sample. First, the intermediate feature set z is subject to bilinear interpolation, so that all feature maps in the intermediate feature set z have the same width and height as the images in the sample set x. Then, the interpolated results are spliced, sample by sample, behind the x in the channel dimension, so that one positive sample that can be directly inputted to the discriminator is obtained. The processing manner of the sample (x̃,z̃) is similar to that of (x,z), and may obtain one negative sample that can be directly inputted to the discriminator. The above two samples are used as one batch of samples to train the discriminator. The objective function of the discriminator is:

$$L_1 = -\log(T(x,z)) - \log(1 - T(\tilde{x}, \tilde{z})).$$

Wherein, $L_1$ represents the objective function of the discriminator. T( ) represents the output of the discriminator. T(x,z) represents the result obtained by inputting the positive sample (x,z) to the discriminator after the above-mentioned splicing process. T(x̃,z̃) represents the result obtained by inputting the negative sample (x̃,z̃) in the discriminator after the above-mentioned splicing process.

Further, based on the extracted intermediate feature set z, a decoder $D_M$ is designed, to map the intermediate feature set z into an image set m. The decoder can be connected by several convolution modules, wherein the implementation of the convolution module can be an inception module, or a convolution layer followed by an activation layer, or a residual module. The number of the convolution modules is consistent with that of the encoder $E_M$, and the last layer of each convolution module is a 2×2 up-sampling layer. The last convolution module of the decoder is a 1×1 convolution layer, followed by an activation function (for example, the Sigmoid function). In this way, the decoder reconstructs an image set m without an anomalous area. The objective function of this step is:

$$L_2 = \Sigma_i \Sigma_j \| m_{i,j} - x_{i,j} \|_{l_1}.$$

Wherein, $L_2$ represents the objective function of the decoder. i represents the serial number of the sample in a batch sample set. j represents the serial number of the image channel. $m_{i,j}$ represents the channel matrix with serial number j of the output image obtained from the sample with serial number i inputted to the autoencoder. $x_{i,j}$ represents the channel matrix with the serial number j of the sample with serial number i. $\| \|_{l_1}$ represents $l_1$ norm. The channel matrix is a matrix composed of pixel values on the corresponding channel.

In summary, the training process of the autoencoder based on mutual information is as follows:

In the first step, train the encoder, discriminator and decoder on the data set without anomalies. The objective function of the autoencoder is:

$$L_3 = KL(z,q) + \lambda_1 \times L_1 + \lambda_2 \times L_2.$$

Wherein, $L_3$ represents the total objective function. KL(z, q) represents relative entropy. $L_1$ represents the objective function of the discrimination. $L_2$ represents the objective function of the decoder. $\lambda_1$ represents the weight of the objective function of the discriminator. $\lambda_2$ represents the weight of the objective function of the decoder. $\lambda_1$ can be set to 1.0, and $\lambda_2$ can be set to 0.1.

In the second step, the discriminator T distinguishes the positive samples from the negative samples through the objective function $L_1 = -\log(T(x,z)) - \log(1 - T(\tilde{x}, \tilde{z}))$.

In the third step, repeat the first step and second step more than 200 times to ensure network convergence.

The hyper-parameters used in this process are just an example. All changes in the hyper-parameters during the training process fall within the protection scope of this patent.

In certain optional implementations of some embodiments, the above-mentioned executive body may obtain the first reconstructed image through the following steps:

In the first step, scale the test image to a predetermined size to obtain a target image. The predetermined size may be an image size that can be directly received by the above-mentioned autoencoder.

In the second step, input the target image to the autoencoder to obtain the first reconstructed image; input the target image to the trained autoencoder, and the output result obtained is the first reconstructed image.

In Step 103: Input the first reconstructed image to the expert network to obtain a second reconstructed image.

Figure 5:
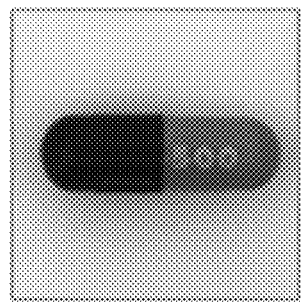
FIG. 5 is a schematic diagram of still another application scenario of the image anomaly detection method according to some embodiments of this disclosure.

In some embodiments, the above-mentioned executive body may input the first reconstructed image to the expert network, and the output result obtained is the second reconstructed image. For example, from the second reconstructed image as obtained in FIG. 5 it can be seen that, as compared with FIG. 4, the manifestation of the second reconstructed image is an image with a fairly high definition and no anomalous area, which has local information similar to that of the test image, for example, the number 500 as can be seen.

The above-mentioned expert network can be obtained through the following process:

In the process of training the autoencoder, for each training sample x, a corresponding image m with no anomalous area is generated. The expert network conducts supervised learning with such data pairs (m,x) as the training sample set, learning the mapping from M to X, wherein m∈M, M is the set of m. The expert network may consist of an encoder $E_X$ and a decoder $D_X$. Wherein, $E_X$ can be composed of a convolutional neural network followed by several residual modules and finally through an adaptive pooling layer, and $D_X$ can be composed of several residual modules followed by a convolutional neural network, then followed by a 1×1 convolution layer and then a Sigmoid activation function. $E_X$ and $D_X$ learn a mapping from M to X together. The objective function of the expert network is:

$$L_4 = \Sigma_i \|x_i - \hat{m}_i\|_2.$$

Wherein, $L_4$ represents the objective function of the expert network. i represents the serial number of the image channel. $x_i$ represents the channel matrix with the serial number i of the second element x in the training sample (m,x). $\hat{m}$ represents the output image obtained by inputting the first element m in the training sample (m,x) to the expert network. $\hat{m}_i$ represents the channel matrix of the image $\hat{m}$ with the serial number i. $\| \|_2$ represents $L_2$ norm of the matrix. Repeat the training until the network converges. It should be noted that the image m inputted to the expert network with no anomalous area can be replaced in the form of a batch of images to increase the training speed.

In Step 104: Generate an anomaly score matrix based on the test image, the first reconstructed image, the second reconstructed image, and the perceptual measurement method.

In some embodiments, the above-mentioned executive body may input the test image, first reconstructed image, and second reconstructed image to a perceptual test method, and uses various means to obtain an anomaly score matrix.

In certain optional implementations of some embodiments, the above-mentioned execution body may generate an anomaly score matrix according to the following formula:

$$\begin{cases} e = \sum_l \dfrac{\lambda_l}{c_l} \times \text{rescale}\, (\varphi_l(x,m) + \varphi_l(x,\hat{x})) \\ \varphi_l(x,m) = \sum_{i^{(l)}=1}^{c_l} |f_{i^{(l)}}(x) - f_{i^{(l)}}(m)| \\ \varphi_l(x,\hat{x}) = \sum_{i^{(l)}=1}^{c_l} |f_{i^{(l)}}(x) - f_{i^{(l)}}(\hat{x})| \end{cases}$$

wherein, e represents the anomaly score matrix; l represents a serial number of a hidden layer in a preset network model; λ represents a preset weight in the preset network model; $\lambda_l$ represents a preset weight of the $l^{th}$ hidden layer in the preset network model; c represents a number of feature maps in the preset network model; $c_l$ represents a number of feature maps in the $l^{th}$ hidden layer in the preset network model; x represents the target image; m represents the first reconstructed image; $\hat{x}$ represents the second reconstructed image; φ( ) represents a distance matrix over feature space in the preset network model; $\varphi_l( )$ represents a distance matrix over feature space of the $l^{th}$ hidden layer in the preset network model; $\varphi_l(x,\hat{x})$ represents a distance between two feature map sets generated on the $l^{th}$ hidden layer when the x and m are respectively inputted to the preset network model; $\varphi_l(x,\hat{x})$ represents a distance between two feature map sets generated on the $l^{th}$ hidden layer when the x and $\hat{x}$ are respectively inputted to the preset network model; rescale ( ) represents up-sampling; rescale ($\varphi_l(x,m)+\varphi_l(x,\hat{x})$) represents up-sampling a sum of distance matrices $\varphi_l(x,m)$ and $\varphi_l(x,\hat{x})$ to a size of the target image; $i^{(l)}$ represents a serial number of the feature map in the $l^{th}$ hidden layer in the preset network model; f( ) represents a matrix corresponding to the feature map; $f_{i^{(l)}}( )$ represents a matrix corresponding to the $i^{th}$ feature map of the $l^{th}$ hidden layer; | | indicates taking an absolute value element by element; $|f_{i^{(l)}}(x) - f_{i^{(l)}}(m)|$ means to take an absolute value of each element in a matrix $f_{i^{(l)}}(x) - f_{i^{(l)}}(m)$; $|f_{i^{(l)}}(x) - f_{i^{(l)}}(\hat{x})|$ means to take an absolute value of each element in a matrix $f_{i^{(l)}}(x) - f_{i^{(l)}}(\hat{x})$.

In Step 105: Generate anomalous area information based on the anomaly score matrix.

Figure 6:
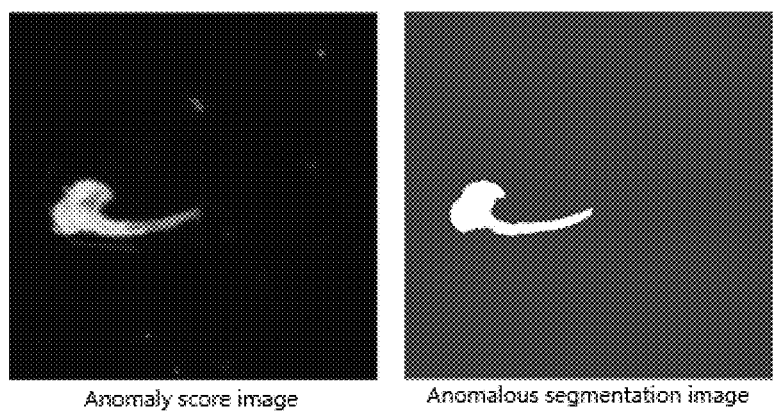
FIG. 6 is a schematic diagram of a further application scenario of the image anomaly detection method according to some embodiments of this disclosure.

In some embodiments, the above-mentioned executive body may perform various transformations to the anomaly score matrix to generate anomalous area information. According to the correspondence between the matrix and the image, an anomaly score matrix may correspond to an anomaly score map. For example, see the left image of FIG. 6, the anomalous area is highlighted.

In certain optional implementations of some embodiments, the above-mentioned executive body may generate anomalous area information through the following steps:

In the first step, generate an anomalous area matrix based on the anomaly score matrix through the following formula:

$$y_{i,j} = \begin{cases} 1, & e_{i,j} > \alpha \\ 0, & \text{others} \end{cases}.$$

Wherein, i represents the row number of the anomaly score matrix and the anomalous area matrix. j represents the column number of the anomaly score matrix and the anomalous area matrix. y represents the anomalous area matrix. $y_{i,j}$ represents the value of element in the $i^{th}$ row and $j^{th}$ column of the anomalous area matrix. e represents the anomaly score matrix. $e_{i,j}$ represents the value of element in the $i^{th}$ row and $j^{th}$ column of the anomaly score matrix. ∝ represents the preset threshold. The preset threshold can be 0.5.

In the second step, generate anomalous area information based on the anomalous area matrix. The anomalous area matrix can be used as anomalous area information. An anomalous region matrix corresponds to a binary image, which is called an anomalous segmentation image. This image displays the anomalous area and the non-anomalous area in two different colors. If the anomalous segmentation image has only one color, it means that the test image has no anomalous area. For example, an anomalous area matrix corresponds to an anomalous segmentation map. As shown in the right image of FIG. 6, the anomalous area is highlighted and accurately located.

The above description is only some preferred embodiments of this disclosure and an explanation of the applied technical principles. Those skilled in the art should understand that the scope of invention involved in the embodiments of this disclosure is not limited to the technical solutions formed by the specific combination of the above technical features, but at the same time should also cover other technical solutions formed by any combination of the above technical features or their equivalent features in the case of not departing from the above-mentioned inventive concept, for example, technical solutions formed by replacing the above features with the technical features of similar functions disclosed in (but not limited to) the embodiments of this disclosure.

The invention claimed is:

1. A method for image anomaly detection, comprising:
   obtaining a test image;
   inputting the test image to an autoencoder to obtain a first reconstructed image, wherein a manifestation of the first reconstructed image is an image with no anomalous area;

inputting the first reconstructed image to an expert network to obtain a second reconstructed image, wherein a manifestation of the second reconstructed image is an image with no anomalous area;

generating an anomaly score matrix based on the test image, the first reconstructed image, the second reconstructed image and a perceptual measurement method;

generating anomalous area information based on the anomaly score matrix.

2. The method of claim 1, wherein said inputting the test image to an autoencoder to obtain a first reconstructed image includes:

scaling the test image to a predetermined size to obtain a target image;

inputting the target image to the autoencoder to obtain the first reconstructed image.

3. The method of claim 2, wherein the perceptual measurement method is implemented by the following formula:

$$\begin{cases} e = \sum_l \frac{\lambda_l}{c_l} \times \text{rescale } (\phi_l(x, m) + \phi_l(x, \hat{x})) \\ \varphi_l(x, m) = \sum_{i^{(l)}=1}^{c_l} \left| f_{i^{(l)}}(x) - f_{i^{(l)}}(m) \right| \\ \varphi_l(x, \hat{x}) = \sum_{i^{(l)}=1}^{c_l} \left| f_{i^{(l)}}(x) - f_{i^{(l)}}(\hat{x}) \right| \end{cases}$$

wherein, e represents the anomaly score matrix; l represents a serial number of a hidden layer in a preset network model; $\lambda_l$ represents a preset weight of the $l^{th}$ hidden layer in the preset network model; $c_l$ represents a number of feature maps in the $l^{th}$ hidden layer in the preset network model; x represents the target image; m represents the first reconstructed image; $\hat{x}$ represents the second reconstructed image; $\phi_l$ represents a distance matrix over feature space of the $l^{th}$ hidden layer in the preset network model; $\varphi_l(x,m)$ represents a distance between two feature map sets generated on the $l^{th}$ hidden layer when the x and m are respectively inputted to the preset network model; $\varphi_l(x,\hat{x})$ represents a distance between two feature map sets generated on the $l^{th}$ hidden layer when the x and $\hat{x}$ are respectively inputted to the preset network model; rescale $(\phi_l(x,m)+\phi_l(x,\hat{x}))$ represents up-sampling a sum of distance matrices $\varphi_l(x,m)$ and $\varphi_l(x,\hat{x})$ to a size of the target image; $i^{(l)}$ represents a serial number of the feature map in the $l^{th}$ hidden layer in the preset network model; $f_{i^{(l)}}$ represents a matrix corresponding to the $i^{th}$ feature map of the $l^{th}$ hidden layer; $|f_{i^{(l)}}(x)-f_{i^{(l)}}(m)|$ means to take an absolute value of each element in a matrix $f_{i^{(l)}}(x)-f_{i^{(l)}}(m)$; $|f_{i^{(l)}}(x)-f_{i^{(l)}}(\hat{x})|$ means to take an absolute value of each element in a matrix $f_{i^{(l)}}(x)-f_{i^{(l)}}(x)$.

4. The method of claim 3, wherein said generating anomalous area information based on the anomaly score matrix includes:

generating an anomalous area matrix based on the anomaly score matrix by the following formula:

$$y_{i,j} = \begin{cases} 1, & e_{i,j} > \propto \\ 0, & \text{others} \end{cases},$$

wherein, i represents a row number of the anomaly score matrix and the anomalous area matrix, j represents a column number of the anomaly score matrix and the anomalous area matrix, $y_{i,j}$ represents a value of element in the $i^{th}$ row and $j^{th}$ column of the anomalous area matrix, $e_{i,j}$ represents a value of element in the $i^{th}$ row and $j^{th}$ column of the anomaly score matrix, and $\propto$ represents a preset threshold;

generating the anomalous area information based on the anomaly score matrix.

* * * * *